United States Patent
Schlagbauer

(10) Patent No.: US 9,182,898 B2
(45) Date of Patent: Nov. 10, 2015

(54) DISPLAY DEVICE OF A MOTOR VEHICLE AND METHOD FOR OPERATING THE DISPLAY DEVICE

(71) Applicant: AUDI AG, Ingolstadt (DE)

(72) Inventor: Georg Schlagbauer, Laimerstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/396,490

(22) PCT Filed: Mar. 14, 2013

(86) PCT No.: PCT/EP2013/000788
§ 371 (c)(1),
(2) Date: Oct. 23, 2014

(87) PCT Pub. No.: WO2013/170918
PCT Pub. Date: Nov. 21, 2013

(65) Prior Publication Data
US 2015/0077439 A1 Mar. 19, 2015

(30) Foreign Application Priority Data
May 18, 2012 (DE) .......................... 10 2012 009 881

(51) Int. Cl.
G09G 5/00 (2006.01)
G06F 3/033 (2013.01)
(Continued)

(52) U.S. Cl.
CPC .............. *G06F 3/0485* (2013.01); *B60K 35/00* (2013.01); *B60K 37/06* (2013.01); *G06F 3/038* (2013.01); *G06F 3/0362* (2013.01);
(Continued)

(58) Field of Classification Search
CPC combination set(s) only.
See application file for complete search history.

(56) References Cited

U.S. PATENT DOCUMENTS 4,608,656 A * 8/1986 Tanaka ............... G01C 21/3667
340/988
5,179,648 A 1/1993 Hauck
(Continued)

FOREIGN PATENT DOCUMENTS

DE 202 21 758 U1 5/2007
DE 10 2012 009 881.2 5/2012
(Continued)

OTHER PUBLICATIONS

WIPO English language translation of the International Preliminary Report on Patentability for PCT/EP2013/000788, mailed Nov. 20, 2014, 8 pages.
Office Action issued Dec. 14, 2012 for corresponding German Patent Application No. 10 2012 009 881.2.
International Search Report mailed Jun. 5, 2013 for corresponding International Patent Application No. PCT/EP2013/000788.

*Primary Examiner* — M Good Johnson
(74) *Attorney, Agent, or Firm* — Staas & Halsey LLP

(57) ABSTRACT

A method for operating a display device of a motor vehicle, by which image content in a shift step or in a plurality of shift steps which are carried out one after another with an image repetition frequency are shifted to a target position on a screen, and in the process the target position is predefined by a memory content of a target position memory, and the memory content is changed as a function of signal pulses which are generated by an operator control element, activated by a user, the pulse rate of which is lower than the image repetition frequency. The scrolling is intended to take place uniformly. For this purpose, a sequence composed of a plurality of component pulses is generated for at least one of the signal pulses, and the memory content is changed with the image repetition frequency on the basis of the component pulses.

21 Claims, 4 Drawing Sheets

(51) Int. Cl.

| | | |
|---|---|---|
| *G06F 3/0485* | (2013.01) | |
| *B60K 35/00* | (2006.01) | |
| *G06F 3/038* | (2013.01) | |
| *G06F 3/0362* | (2013.01) | |
| *G06F 3/0489* | (2013.01) | |
| *B60K 37/06* | (2006.01) | |
| *G06T 1/60* | (2006.01) | |
| *G06T 5/00* | (2006.01) | |

(52) U.S. Cl.
CPC .............. *G06F 3/04892* (2013.01); *G06T 1/60* (2013.01); *G06T 5/002* (2013.01); *B60K 2350/102* (2013.01)

(56) References Cited

U.S. PATENT DOCUMENTS

| | | | |
|---|---|---|---|
| 8,078,779 B2 * | 12/2011 | Lin | G06F 1/3203 710/65 |
| 8,902,319 B2 * | 12/2014 | Ishihara | G06G 3/20 348/208.13 |
| 2003/0151588 A1 | 8/2003 | Rensberger | |
| 2004/0061678 A1 | 4/2004 | Goh et al. | |
| 2011/0169733 A1 | 7/2011 | Miyazaki et al. | |

FOREIGN PATENT DOCUMENTS

| | | |
|---|---|---|
| EP | 1 553 484 A2 | 7/2005 |
| WO | PCT/EP2013/000788 | 3/2013 |

\* cited by examiner

DISPLAY DEVICE OF A MOTOR VEHICLE AND METHOD FOR OPERATING THE DISPLAY DEVICE

CROSS REFERENCE TO RELATED APPLICATIONS

This application is based on and hereby claims priority to International Application No. PCT/EP2013/000788 filed on Mar. 14, 2013 and German Application No. 10 2012 009 881.2 filed on May 18, 2012, the contents of which are hereby incorporated by reference.

BACKGROUND

The invention relates to a method for operating a display device of a motor vehicle, by which image content on a screen. The invention also includes a display device of a motor vehicle.

In a motor vehicle, provision may be made for a list of function names to be displayed to a user on a screen of a display device, from which the user can choose in order to activate the named function. The display device may be part of a combination instrument or an infotainment system, for example. The user must then be able to move a cursor, for example, over the list elements in order to mark the desired function. Provision may similarly be made for the user to shift the list elements in the displayed list in such a manner that the desired list entry is at the very top, for example, and is activated hereby when a confirmation key is actuated. In order to move the cursor or shift the list contents, a rotary actuator or a rocker switch, for example, may be provided to the user in the motor vehicle as an operating element. Such operating elements generally cannot be used to produce continuous signals. The dial of a rotary actuator may therefore have latching positions. If the latching position changes, this is detected by an encoder of the rotary actuator in intervals of 30 ms to 60 ms, for example, and an electrical signal pulse is then generated, which pulse indicates the direction of rotation and signals the number of latching positions by which the dial has been shifted since the last detection. Such a signal pulse is also referred to as a tick.

When the operating element is actuated, a cursor, for example, is nevertheless not shifted on the screen suddenly with each received signal pulse but rather in a sliding movement. For this purpose, memory content of a target position memory is changed in the display device on the basis of the signal pulses and the sliding scrolling is then shifted to the target position in a plurality of steps of shifting the image content on the screen. This technique is also referred to as "scrolling". The screen display is updated during scrolling at an image refresh rate which may be 60 Hz or 120 Hz, for example, and therefore allows flowing movements to be represented.

If the user generates a plurality of signal pulses by actuating the operating element, the memory content is successively updated as a result. The sliding scrolling is carried out in the meantime. After the user has then stopped rotating the dial, the target position has by no means been reached. Undesirably long running-on of the shifting operation on the screen may therefore result. If the user also changes the direction of rotation of the dial in this case during actuation, the situation may occur in which the cursor is first of all shifted in the one direction for a while and only then changes its movement direction, whereas the user has already stopped rotating the dial. In this case, the movement of the image content on the screen loses the relationship to the actual operating action.

An animation acceleration method may therefore be provided for such animations. This is explained below using FIG. 1.

FIG. 1 indicates by way of example, on a time axis along the time t (here indicated in seconds), when signal pulses P1 to P9 are generated by an operating element, for example a rotary actuator, and arrive at a control device of a display device of a motor vehicle. At the normal actuation speed, a pulse amplitude of these ticks is one. In this case, a tick with the pulse amplitude of one shifts image content, for example a cursor, by a particular shifting distance, for example 5 pixels or 10 pixels, on the screen of the display device. In the graph in FIG. 1, this applies to the signal pulses P1 to P5 and P9. The signal pulses P6 to P8 have larger pulse amplitudes since the user has adjusted the operating element with a faster movement in this case. The shifting of the image content must accordingly be greater. The graph in FIG. 1 also indicates the memory content Z of the target position memory mentioned. It is changed with the arrival of each pulse P1 to P9. The time grid in which the memory content Z is plotted against the time in FIG. 1 corresponds to that stipulated by the image refresh rate of the display device.

At a time t=0, an actual position I of the image content on the screen corresponds to the target position predefined by the memory content Z. A difference D between the memory content Z and the actual position I results with the arrival of a signal pulse. The image content is then moved at a constant speed to the target position Z in a sliding scrolling movement. The step size of each shifting step when updating the screen content is initially a basic step size on which the shifting is based until the arrival of the signal pulse P6. For this reason, a linear curve profile of the actual position I results until the time t=0.3 seconds at which the actual position corresponds to the target position again. The step size was determined by a scrolling speed for each image refresh (the graph with the solid line in FIG. 1). With the arrival of the signal pulses P5 and P6, the difference D exceeds a threshold value which may be 2 in this case, for example. For this reason, the scrolling speed is increased after the arrival of the signal pulse P5. The image content is therefore shifted in greater shifting steps for each new image structure. As a result, the difference D undershoots the threshold value again between the arrival of the signal pulses P6 and P7. The scrolling speed is then reduced to 1 again (t=0.55 s). The signal pulse P7 then arrives, with the result that the difference D is above the threshold value again and the scrolling speed is set to the value 3 again. The user perceives this change in the scrolling speed as an unsettled, jumpy movement of the image content on the screen.

SUMMARY

One possible object is to enable uniform scrolling at a variable scrolling speed in a display device of a motor vehicle.

The inventor proposes a method for shifting image content, perhaps in a scrolling movement. In this case, the image content is shifted to a target position in a shifting step or a plurality of shifting steps carried out in succession. The scrolling can be initiated by a user of the display device by actuating an operating element. When actuated, the operating element generates at least one signal pulse. The inventor proposes for a sequence of a plurality of partial pulses to be generated for at least one of the signal pulses, and for the memory content of the target position memory to be gradually changed at the image refresh rate on the basis of the partial pulses. In other words, the time grid in which the signal pulses are generated by the operating element is therefore adapted to the time grid of the screen animation using rate adaptation.

The proposal has the advantage that the target position is never suddenly adapted according to the pulse amplitude of a signal pulse but rather only in small substeps. The jumpy movements described can therefore be avoided. The method achieves the object, in particular, for a display device in which image content, for example a cursor or a list, is shifted on a screen, the display of which is updated at an image refresh rate which is greater than the maximum pulse rate of the signal pulses generated by an operating element of the display device when actuated. The adaptation of the time grids has proved to be particularly favorable here, in particular.

In connection with the proposal, moving image content may be, for example, a cursor which slides over a background image. In this case, the cursor need not completely cover the image background. It may also be, for example, a changed representation of the background, for example in inverted colors. Further examples of movable image contents are list contents, for instance selection menus, and other graphical representations or else shadow effects which are moved, as transparent colored fields, over stationary image contents.

The method can be carried out using the display device. The latter has a screen, at least one operating element which, when actuated, generates at least one signal pulse, and a control device. The control device has a target position memory and is coupled to the operating element. It is also selected to display image content on the screen and to shift said image content on the screen according to one embodiment of the method. The display device is preferably a combination instrument, as can be installed behind the steering wheel of a motor vehicle, or an infotainment system.

The operating element may comprise, for example, a rotary actuator, a toggle switch or a roller. However, the operating element may also comprise a touchpad. Such a touchpad has an operating surface across which a user can swipe, for example using a finger, which is then detected by a sensor device of the touchpad (for example using contact sensors, infrared sensors, capacitive sensors). The sensor device then generates, in a predetermined time pattern, a signal which describes the coordinates of the current contact point. The difference between the coordinates of the current contact point and the coordinates of the preceding contact point can then likewise be processed as a signal pulse. These difference pulses can also be divided into partial pulses.

One development of the method provides for each signal pulse to be filtered using a filter in order to generate the partial pulses. The sequence of partial pulses which is then generated for a signal pulse corresponds to the pulse response of the filter. It is therefore possible to stipulate suitable sequences of partial pulses in a particularly simple and clear manner. It has proved to be particularly expedient in this case to use a filter having a pulse response consisting of the sequence of values 0.4; 0.4; 0.2, for example. In this case, the smaller last value 0.2 results in a fadeout effect. However, the division may also be selected differently. In addition, it is possible to provide switching logic which prevents partial pulses of successive signal pulses being directly superimposed. This makes it possible to additionally avoid jitter in the event of an approximately identical rotary actuator movement.

Another development of the method provides for the sum of the pulse amplitude values of the partial pulses generated for a signal pulse to be the same as the pulse amplitude value of the signal pulse itself. This is achieved, for example, by the above-described filter with the pulse response 0.4; 0.4; 0.2. Restricting the sum of the pulse amplitude values avoids an amplification effect which might result in an excessively large value for the target position.

Another embodiment of the method provides for the sequence of partial pulses formed for a signal pulse to be selected to be so short that it comprises no more than 4 partial pulses at an image refresh rate of 60 Hz and no more than 8 partial pulses at an image refresh rate of 120 Hz. This preserves a temporal relationship to the actual actuation of the operating element. Depending on the hardware used, this condition can also be met by virtue of all partial pulses generated for a signal pulse being entered in the target position memory within a period which is shorter than 80 ms, in particular shorter than 40 ms. These time values have proved to be particularly important benchmark figures in experiments.

The described division of each signal pulse into a plurality of partial pulses makes it particularly easy to configure the scrolling speed to be variable when shifting image content. In this case, it is noted that the scrolling speed for a given image refresh rate directly results from the step size of a shifting step, that is to say the distance by which the image content on the screen is shifted for each new image structure. In order to provide a variable speed, one embodiment of the method now provides for a step size of at least one of the shifting steps to be stipulated on the basis of a difference value between an actual position of the image content on the screen and the target position. The jumpy effect is omitted here by generating and superimposing the partial pulses.

According to one development of this approach, the difference value is assigned to a multiplication factor for a basic step size, and the step size is then calculated by multiplying the basic step size by the multiplication factor. This results in the advantage that fundamental dynamics, with which image contents move on the screen, can be stipulated very easily in a display device by stipulating the basic step size. A user then far more easily gets a feel for how he should actuate an operating element in order to shift a cursor, for example, by a desired distance. He can estimate its dynamics more easily.

Dividing a signal pulse into a sequence of partial pulses even makes it possible to completely dispense with tracking of the image content at a limited scrolling speed. In this respect, one embodiment of the method provides for at least occasionally the image content to be immediately shifted to the target position currently predefined by the memory content of the target position memory in each shifting step. The fact that this still results in comprehensible scrolling for the user can be ensured here in a simple manner by accordingly stipulating the sequence of partial pulses. Only simple tests are required for this purpose. In this context, one preferred embodiment of the method provides for the image content to be shifted to a derived target position formed from the memory content of the target position memory using a smoothing filter, rather than being directly shifted to the target position. In particular, provision is made here for a PT1 element to be used as the smoothing filter. In this respect, it has emerged that this variant provides very up-to-date animation during actuation of the operating element and a user can nevertheless very effectively view the changes on the screen. The haptic relationship can be set in a very favorable manner here.

The scrolling speed need not necessarily be adapted on the basis of the difference value. This assumes that running-on must first of all be established. The scrolling speed is adapted in a very much quicker manner if the scrolling speed, that is to say the step size, is increased when signal pulses are generated at a predetermined maximum pulse rate and/or a pulse amplitude of at least one signal pulse is greater than a predetermined threshold value. It is then already clear that the user operates the operating element with particularly intense movements. This is a clear indication that he wants quick scrolling.

If no new signal pulses then arrive for a period of between 30 ms and 60 ms, for example, the current animation speed should first of all be retained and the animation speed should be reduced to a normal degree again only after this period if a defined operating gap has been detected. Accordingly, one embodiment of the method provides for the scrolling speed to only be reduced again if no further signal pulses are generated for a predetermined period, wherein the period is preferably in a range of 30 ms to 60 ms, for example.

The method can also be combined with already known animation control methods. In this context, one embodiment of the method provides for a step size of at least one of the shifting steps to be set on the basis of an animation characteristic curve. If the target position is so far away from the actual position that a plurality of shifting steps are needed in any case, such an animation characteristic curve stipulates the practice of shifting the image content slowly at the start of the shifting process, more quickly in a central region of the shifting phase and slowly again as the target position is approached. This form of speed control is also called "ease in, ease out".

As already stated, provision may also be made for list entries in a list to be shifted or for a cursor to be shifted over such list entries using the described display device. If the scrolling speed is set to be so high during shifting that only one to two intermediate steps are represented on account of the permanently predefined image refresh rate, while the cursor, for example, moves from one list entry to the next, the representation of these intermediate steps should be dispensed with and instead a change should be made to fixed display positions on the individual list entries. In other words, the cursor is then moved exactly to the list entries and is moved from one list entry to the next virtually without animation. Otherwise, the user perceives the transitions only as unpleasant snapshots which are no longer perceived, however, as a clean animation with movement indication. On the basis of this knowledge, the proposal provides a development of the method in which a check is carried out in order to determine whether the pulse rate and/or a pulse amplitude of at least one signal pulse is/are greater than a predetermined threshold value. If necessary, a step size of at least one of the shifting steps is set to a grid spacing of list entries in a list or a multiple of the grid spacing. Different threshold values can naturally be used, depending on whether the pulse rate or the pulse amplitude is checked.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
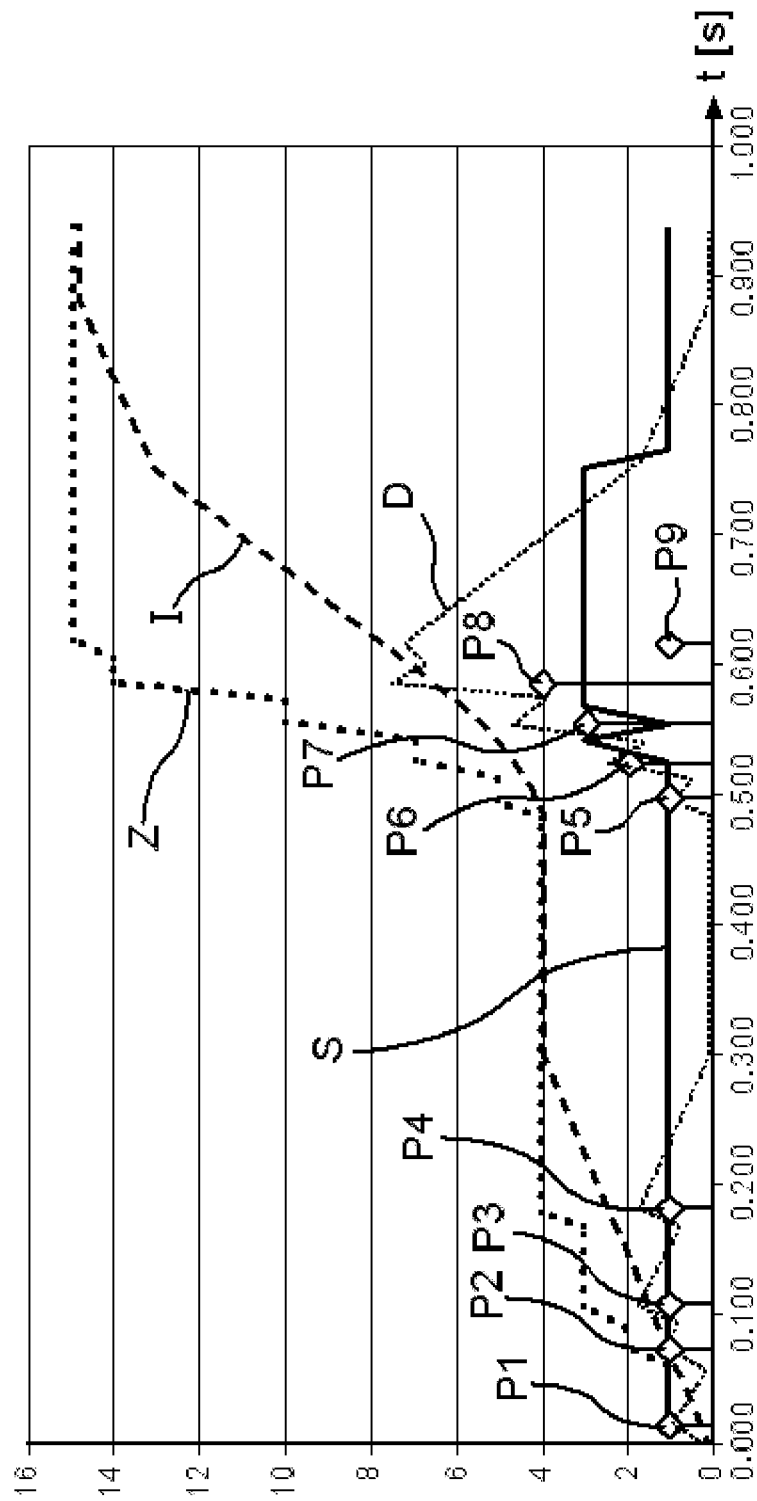
FIG. 1 shows a graph for shifting image content, as is carried out according to the related art.

Reference will now be made in detail to the preferred embodiments of the present invention, examples of which are illustrated in the accompanying drawings, wherein like reference numerals refer to like elements throughout.

Figure 2:
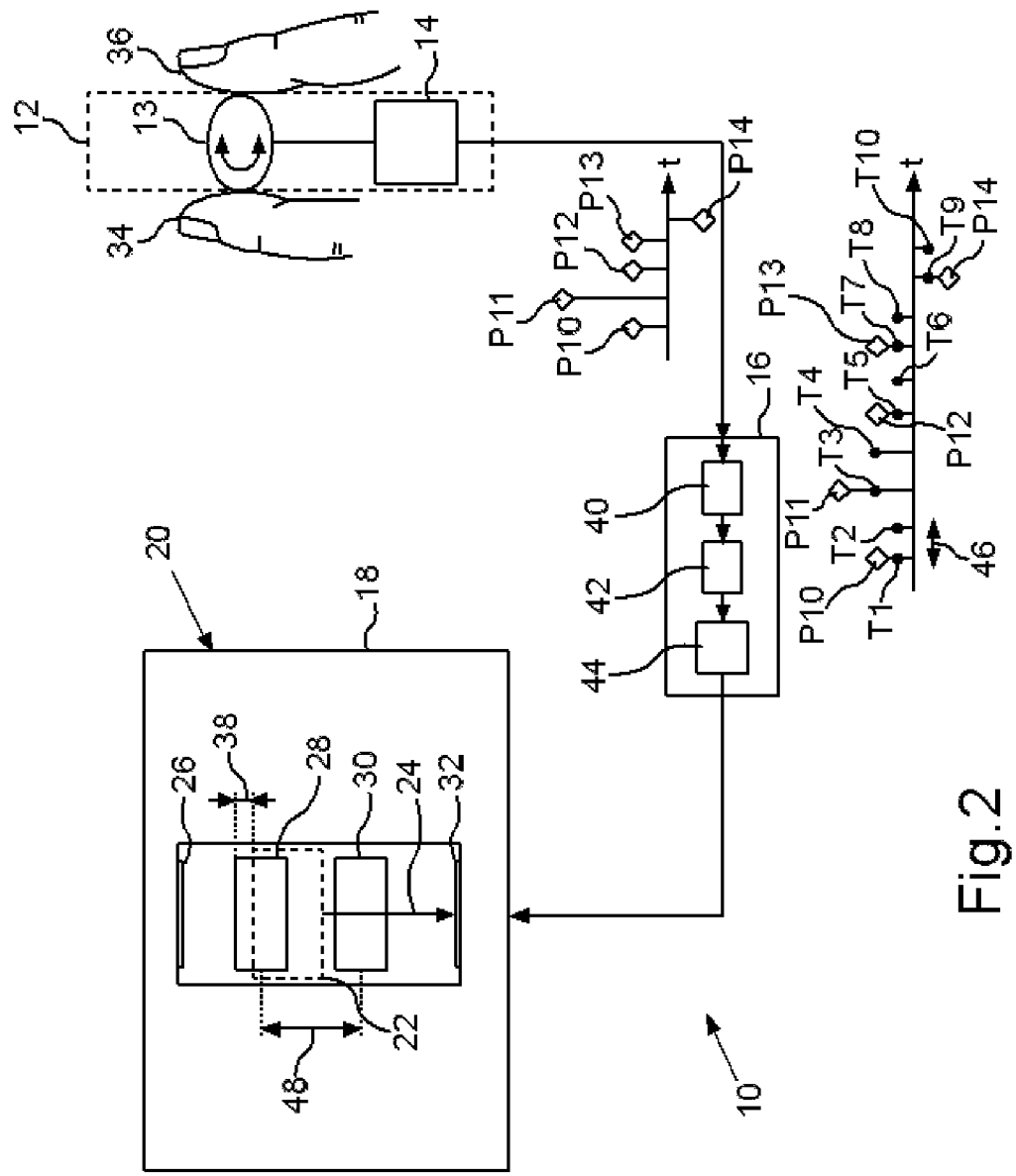
FIG. 2 shows a schematic illustration of a preferred embodiment of the proposed display device.

FIG. 2 shows a display device 10 of a motor vehicle, for example an automobile. The display device may comprise a rotary actuator 12. A rotary movement of a dial 13 is signaled by an encoder 14, which is coupled to the dial 13, by electrical signal pulses. A control device 16 of the display device 10, for example a control unit, receives the signal pulses from the encoder 14. The control device 16 controls a screen 18 of the display device on the basis of the received signal pulses. The display device 10 may be, for example, part of an infotainment system. The screen 18 may also be a combination instrument which is installed behind a steering wheel of a motor vehicle. Instead of the rotary actuator 12, it is also possible to provide another operating element, for instance a roller or a toggle switch or a touchpad.

In the present example, image content 22 is moved on the screen 18 on a display 20 in a flowing movement (animation) in a movement direction 24, here downward. It is assumed here that the moving image content 22 constitutes a cursor. The display 20 may be, for example, a list which is formed from individual list entries 26, 28, 30, 32. The list entries 26 to 32 may each represent, for example, a function which is provided by the motor vehicle and from which a driver (not illustrated) would like to choose one. For example, a list entry may represent activation of a radio.

The moving image content 22 may also be an image detail which comprises part of the display 20 or the entire display 20. The content of this image detail is then moved in a manner referred to as "scrolling". The moving image content may therefore also be formed by the list entries 26 to 32, for example.

For the further explanation of the example, it is assumed that the cursor 22 was initially positioned at the list entry 28. The driver would like to choose the list entry 32. For this purpose, he rotates the dial 13 using his fingers 34, 36. As a result, the dial 13 changes between individual latching positions. The changing of the latching positions is detected by the encoder 14. The latter generates a signal pulse during each detection operation in a time grid of 30 ms or 50 ms, for example. A maximum pulse rate may therefore in this case be $1/30$ ms=33.3 Hz or $1/50$ ms=20 Hz, for example. The mathematical sign of a signal pulse indicates the direction of rotation and its pulse amplitude indicates the number of latching positions which have been passed through since the last detection operation. For the purpose of illustration, FIG. 2 illustrates a time axis on which the exemplary signal pulses P10 to P14 are illustrated against the time t.

The cursor 22 is shifted in the movement direction 24 by rotating the dial 13. The display 20 which changes as a result is represented at an image refresh rate of 60 Hz, for example. In this case, the cursor 22 is illustrated as having been shifted by a step size 38 in two respective successive representations. FIG. 2 illustrates this shift for the first shifting step when the cursor 22 moves away from the list entry 28 in the movement direction 24.

In this case, the scrolling speed of the cursor 22 and the movement direction depend on the speed and the direction of rotation with which the user rotates the rotary actuator 12. The control unit 16 evaluates the signal pulses (or pulses for short) P10 to P14 in order to determine how the cursor 22 should be moved on the display 20. For this purpose, the control device 16 has a keying-up device 40, a target position memory 42 and a representation device 44. The keying-up device 40, target position memory 42 and the representation device 44 may each comprise, for example, a program of a digital signal processor or part of an ASIC (application specific integrated circuit) or of an FPGA (field programmable gate array).

Upon receiving each pulse P10 to P14, the keying-up device 40 generates a plurality of partial pulses T1 to T10 from the received pulse. In this respect, FIG. 2 illustrates the signal comprising the partial pulses T1 to T10, which is shown for the pulses P10 to P14 by the keying-up device 40, in a graph plotted against the time t. For the sake of better clarity, this graph additionally shows which of the pulses P10 to P14 the partial pulses T1 to T10 are formed from. For example, the sequence of partial pulses T1 and T2 is formed from the pulse P10. However, only the partial pulses T1 to T10 themselves are output by the keying-up device 40. The respective partial pulses generated for a pulse are output to the target position memory 42 at a pulse rate which corresponds to the image refresh rate. In other words, an interval of time 46 between two partial pulses which belong to the same pulse is the same as the inverse value of the image refresh rate. The keying-up device 40 may be a filter, for example. In the example shown in FIG. 2, the pulse response of the filter may be formed from a sequence of the values 0.5 and 0.5.

The target position memory 42 stores a value for the target position to which the cursor 22 is intended to be moved on the display 20 by the animated shifting. The animation therefore lasts until the true actual position of the cursor 22 on the screen 20 corresponds to the target position. With each arrival of a partial pulse T1 to T10 at the target position memory 42, the value for the target position is changed according to the pulse amplitude of this partial pulse.

With each reception of a partial pulse T1 to T10, the value for the target position in the target position memory 42 is changed according to the pulse amplitude and the mathematical sign of the partial pulse.

The representation device 44 compares the actual position of the cursor 22 with the value of the target position from the target position memory 42. In this case, when calculating a new display for an image refresh, provision may be made for the step size 38 to be stipulated on the basis of how great the difference is between the actual position and the current target position. Provision may also be made for the step size 38 to be selected to be equal to a grid dimension 48 or a multiple of the grid dimension 48 if the difference exceeds a threshold value.

After the step size 38 has been stipulated, the representation device 44 calculates a display (that is to say pixel values in a graphics memory or position values in a 3-D graphics chip) in which the cursor 22 has been shifted by the step size 38 in comparison with the current display 20. The new display calculated in this manner is then represented on the screen 18. This is cyclically repeated by the representation device 44 at the image refresh rate.

Figure 3:
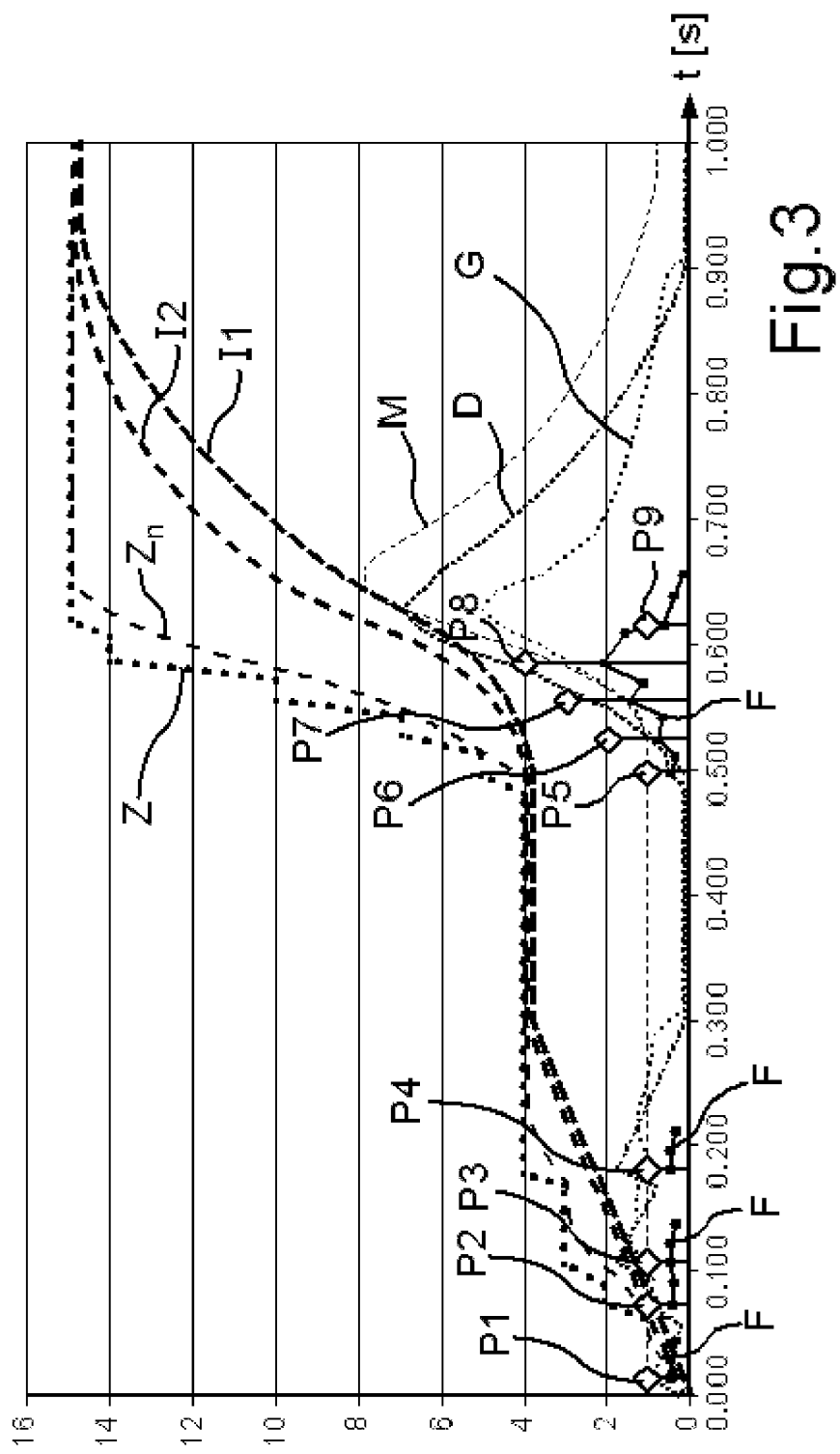
FIG. 3 shows a graph for shifting image content in accordance with one embodiment of the method.
Figure 4:
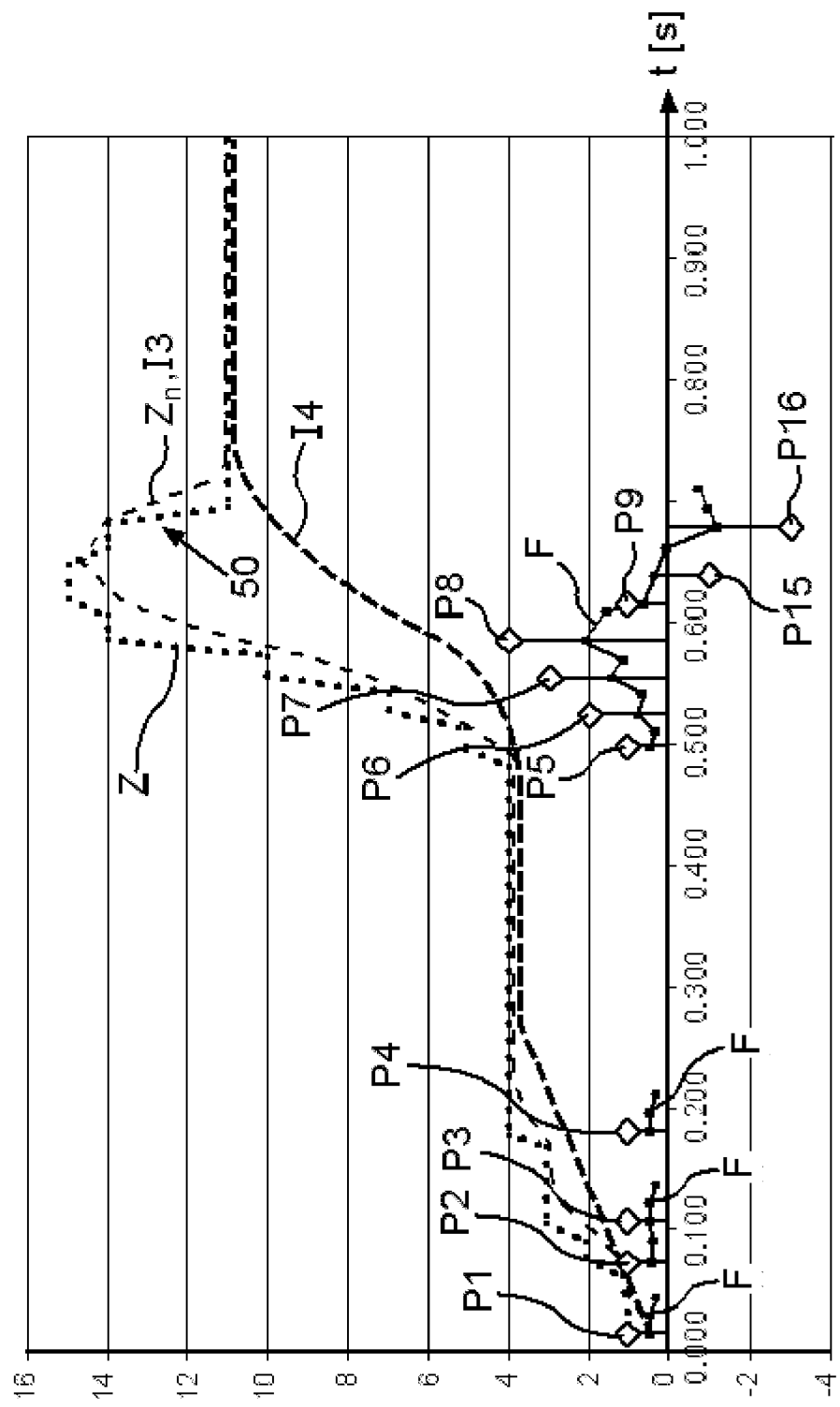
FIG. 4 shows a graph for shifting image content in accordance with a further embodiment of the method.

The movement sequence of image content, for example the cursor 22, is described again in more detail below using FIG. 3 and FIG. 4. For these explanations, it is now assumed here that the keying-up device 40 divides each received signal pulse into three partial pulses, each signal pulse being divided into three successive partial pulses, the signal amplitude of which is divided by the following factors from the pulse amplitude of the signal pulse: 0.4; 0.4; 0.2. Furthermore, the signal pulse sequence from the signal pulses P1 to P9 is taken as a basis, as already described in connection with FIG. 1. FIG. 3 and FIG. 4 illustrate graphs of the same type as in FIG. 1. For simplifying the comparison with the example from FIG. 1, FIG. 3 and FIG. 4 also illustrate the course of the target position Z, as would result if the target position memory 42 were directly changed on the basis of the signal pulses P1 to P9 without the keying-up device 40.

In the display device 10, the keying-up device 40, now with the new pulse response (0.4; 0.4; 0.2), divides each signal pulse P1 to P9 into a sequence of three partial pulses which are transmitted to the target position memory 42 in the time grid of the image refresh and at the image refresh rate. In this case, the sequence of partial pulses may have a duration of up to 40 ms, for example. Partial pulses may also be accordingly superimposed on one another. Therefore, not every individual partial pulse is provided with a reference symbol in FIG. 3, but rather the overall sequence F of partial pulses is illustrated. Each partial pulse changes the memory content in the memory of the target position memory 42, resulting in the target position Zn at the different times. In the manner described, the control device 44 calculates the difference D between the actual position of the cursor 22 and the target position Zn. A multiplication factor M is determined on the basis of a magnitude of the difference D. The multiplication factor M is multiplied by a value for a basic step size, resulting in the step size 38 with which the cursor 22 is intended to be shifted to the respective current display 20 in comparison with the immediately preceding display. The resultant actual position 11 which is variable over time is likewise plotted in FIG. 3. As an alternative to using the multiplication factor M, a speed value G can also be directly calculated from the difference D, for example using a PT1 element. In this respect, a resulting actual position 12 is likewise recorded in FIG. 3.

The example in FIG. 4 shows how the target position is accordingly adapted and is also accordingly approached when the operating element, that is to say the rotary switch 12 for instance, is actuated in the opposite direction. For this purpose, the previously underlying sequence of signal pulses P1 to P9 is extended by two further pulses P15 and P16 which have an inverse mathematical sign in comparison with the signal pulses P1 to P9. When the signal pulses are divided into partial pulses, the sequence F of signal pulses results and causes the target position Zn, as is determined when using the keying-up device 40, to not have a sudden transition 50, as is the case with the target position Z.

The example in FIG. 4 shows that the division of the signal pulses P1 to P9, P15, P16 into the sequence F of partial pulses also makes it possible to shift the cursor 22 in such a manner that its actual position 13 corresponds to the target position Zn at any time. In other words, the actual position is always adjusted to a changed target position Zn within an individual shifting step. As a result, the user of the display device 10 gains the impression that he directly controls the position of the cursor 22 without delay using the rotary actuator 12 and no jumpy movements are nevertheless carried out by the cursor 22 on the display 20. In order to illustrate the immediacy of the control, FIG. 4 also illustrates the course of the actual position 14 which corresponds to the course 12. This immediate adaptation of the actual position can also be carried out in the example illustrated in FIG. 3. The target position Zn (FIG. 3) would then correspond to the actual position. As a further variant, a position characteristic curve Zn (not illustrated) filtered using a PT1 element may also be provided in this context.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for operating a display device of a motor vehicle, comprising:
   predefining a target position, the target position being stored as memory content of a target position memory;
   generating successive signal pulses by an operating element actuated by a user, the successive signal pulses being generated at a pulse rate which is lower than an image refresh rate of the display device; and
   generating a sequence of partial pulses for each of the signal pulses;
   changing the memory content at the image refresh rate, for each partial pulse, the memory content being changed for each partial pulse so as to update the target position to a current target position; and
   shifting image content on a screen of the display device, from a current actual position to the current target position in a single shifting step or in a plurality of shifting steps which are carried out in succession at the image refresh rate, wherein
   at least occasionally the image content is shifted a single shifting step, such that for each shifting step, the image content is shifted from the current actual position to the current target position using a smoothing filter.

2. The method as claimed in claim 1, wherein each signal pulse is filtered using a filter in order to generate the sequence of partial pulses for the signal pulse.

3. The method as claimed in claim 1, wherein a sum of pulse amplitude values of the partial pulses generated for a corresponding signal pulse is equal to a pulse amplitude value of the corresponding signal pulse.

4. The method as claimed in claim 1, wherein
   the sequence of partial pulses generated for each signal pulse comprises no more than 4 partial pulses for each corresponding signal pulse at an image refresh rate of 60 Hz and no more than 8 partial pulses for each corresponding signal pulse at an image refresh rate of 120 Hz, or
   for each signal pulse, the corresponding sequence of partial pulses has a duration shorter than 40 ms.

5. The method as claimed in claim 1, wherein
   each signal pulse has a sequence of corresponding partial pulses, and
   for each signal pulse, the corresponding sequence of partial pulses has a duration shorter than 80 ms.

6. The method as claimed in claim 1, wherein
   at least occasionally, the image content is shifted to the current target position in a plurality of shifting steps,
   each shifting step moves the image content by a step size, and
   the step size is set based on a difference value between the current actual position and the current target position.

7. The method as claimed in claim 6, wherein
   each shifting step moves the image content by at least a basic step size,
   the difference value is assigned to a multiplication factor, and
   the step size is calculated by multiplying the basic step size by the multiplication factor.

8. The method as claimed in claim 1, wherein at least occasionally each shifting step shifts the image content immediately from the current actual position to the current target position.

9. The method as claimed in claim 8, wherein
   when the image content is immediately shifted, the smoothing filter is not used.

10. The method as claimed in claim 1, wherein a PT1 element is used as the smoothing filter.

11. The method as claimed in claim 1, wherein
   at least occasionally, the image content is shifted to the current target position in a plurality of shifting steps,
   each shifting step moves the image content by a step size,
   each signal pulse has a pulse amplitude representing a movement amount for the image content, and
   the step size is increased if the operating element generates the signal pulses at a rate greater than a predetermined maximum pulse rate and/or if the pulse amplitude of at least one signal pulse is greater than a predetermined threshold value.

12. The method as claimed in claim 11, wherein
   shifting the image content involves a scrolling operation having a scrolling speed, and
   the scrolling speed is increased or decreased respectively by increasing or decreasing the step size.

13. The method as claimed in claim 11, wherein
   after the step size has been increased, the step size is reduced again only if no further signal pulses are generated for a predetermined period, and
   the predetermined period is set to a time in a range of 30 ms to 60 ms.

14. The method as claimed in claim 13, wherein
   shifting the image content involves a scrolling operation having a scrolling speed, and
   the scrolling speed is increased or decreased respectively by increasing or decreasing the step size.

15. The method as claimed in claim 11, wherein when the image content is shifted in a plurality of shifting steps, a difference between the current actual position and the current target position is distributed over the plurality of shifting steps.

16. The method as claimed in claim 1, wherein
   at least occasionally, the image content is shifted to the current target position in a plurality of shifting steps,
   each shifting step moves the image content by a step size, and
   the step size of at least one of the shifting steps is set based on an animation characteristic curve.

17. The method as claimed in claim 1, wherein
   at least occasionally, the image content is shifted to the current target position in a plurality of shifting steps,
   shifting the image content comprises moving a list cursor over a list of entries,
   each shifting step moves the image content by a step size, the step size being at least equal to a grid spacing for the list of entries,
   each signal pulse has a pulse amplitude representing a movement amount for the image content,
   the step size is increased if the operating element generates the signal pulses at a rate greater than a predetermined maximum pulse rate and/or if the pulse amplitude of at least one signal pulse is greater than a predetermined threshold value, and
   the step size is increased by setting the step size to an integer multiple of the grid spacing.

18. The method as claimed in claim 1, wherein when the smoothing filter is used for shifting step, the smoothing filter is provided with a signal reflecting a difference between the current actual position and the current target position.

19. The method as claimed in claim 1, wherein no partial pulses are generated to update the target position when the operating element is not actuated.

20. A display device of a motor vehicle, comprising:
a screen to display image content;
an operating element which, when actuated by a user, generates successive signal pulses, the successive signal pulses being generated at a pulse rate which is lower than an image refresh rate of the display device; and
a control device which has a target memory in which a target position is stored as memory content, the control device being coupled to the display device and to the operating element to:
generate a sequence of partial pulses for each of the signal pulses;
change the memory content at the image refresh rate, for each partial pulse, the memory content being changed for each partial pulse so as to update the target position to a current target position; and
shift image content on the screen of the display device, from a current actual position to the current target position in a single shifting step or in a plurality of shifting steps which are carried out in succession at an image refresh rate, wherein
at least occasionally the image content is shifted a single shifting step, such that for each shifting step, the image content is shifted from the current actual position to the current target position using a smoothing filter.

21. The display device as claimed in claim 20, wherein the display device is a combination instrument or an infotainment system.

* * * * *